United States Patent
Geurts et al.

(10) Patent No.: US 10,807,452 B2
(45) Date of Patent: Oct. 20, 2020

(54) ROOF SYSTEM FOR A VEHICLE

(71) Applicant: Inalfa Roof Systems Group B.V., Oostrum (NL)

(72) Inventors: Ruud Geurts, Helden (NL); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 19 days.

(21) Appl. No.: 16/299,895

(22) Filed: Mar. 12, 2019

(65) Prior Publication Data

US 2019/0283557 A1 Sep. 19, 2019

(30) Foreign Application Priority Data

Mar. 16, 2018 (EP) ..................................... 18162273

(51) Int. Cl.
*B60J 7/00* (2006.01)
*B60H 1/24* (2006.01)
(Continued)

(52) U.S. Cl.
CPC ........ *B60J 7/1642* (2013.01); *B60H 1/00564* (2013.01); *B60H 1/245* (2013.01);
(Continued)

(58) Field of Classification Search
CPC ........ B60G 1/245; B60G 1/262; B60G 1/242; B60G 1/241; B60G 1/244; B60G 1/246;
(Continued)

(56) References Cited

U.S. PATENT DOCUMENTS

| | | | | |
|---|---|---|---|---|
| 2,087,651 A | * | 7/1937 | Mygland ................ | B60H 1/262 454/138 |
| 2,523,104 A | * | 9/1950 | Emmert ................. | B60H 1/248 454/138 |

(Continued)

FOREIGN PATENT DOCUMENTS

| | | |
|---|---|---|
| DE | 10200164 C1 | 3/2003 |
| DE | 20321309 U1 | 11/2006 |

(Continued)

OTHER PUBLICATIONS

European Office Action, dated Jan. 18, 2019, for corresponding European Patent Application No. 18162273.9, filed Mar. 16, 2018.
(Continued)

*Primary Examiner* — Dennis H Pedder
(74) *Attorney, Agent, or Firm* — Steven M. Koehler; Westman, Champlin & Koehler, P.A.

(57) ABSTRACT

A roof system for a vehicle having a roof opening in a roof part thereof comprises a transparent panel in the roof opening, and a ventilation system for moving air into and/or out of the vehicle interior. The ventilation system includes an air guiding channel guiding air between the vehicle interior and the environment through at least one ventilation opening. The air guiding channel is fitted centrally below the transparent panel and extends in longitudinal direction of the vehicle, substantially completely along the panel and communicates with the interior at least along a substantial length of the panel through holes.

21 Claims, 9 Drawing Sheets

(51) Int. Cl.
*B60J 7/16* (2006.01)
*B60J 1/00* (2006.01)
*B60J 3/00* (2006.01)
*B60J 3/04* (2006.01)
*B62D 25/06* (2006.01)
*B60H 1/00* (2006.01)
*B60H 1/26* (2006.01)

(52) U.S. Cl.
CPC ............. *B60H 1/248* (2013.01); *B60H 1/262* (2013.01); *B60J 1/001* (2013.01); *B60J 3/007* (2013.01); *B60J 3/04* (2013.01); *B62D 25/06* (2013.01)

(58) Field of Classification Search
CPC .... B60G 1/248; B60G 1/249; B60G 1/00557; B60G 1/564; B60G 1/26; B60G 1/30; B60J 7/22
USPC ......... 296/217, 211, 215; 454/129, 136–143, 454/145
See application file for complete search history.

(56) References Cited

U.S. PATENT DOCUMENTS

| | | | |
|---|---|---|---|
| 5,344,361 | A | 9/1994 | Matthias |
| 6,808,450 | B2 * | 10/2004 | Snow ................. B60H 1/00428 454/137 |
| 6,878,054 | B2 | 4/2005 | Klesing et al. |
| 7,836,705 | B2 | 11/2010 | Teschner et al. |
| 2003/0162490 | A1 | 8/2003 | Klesing et al. |
| 2004/0110459 | A1 | 6/2004 | Snow |
| 2008/0264070 | A1 | 10/2008 | Teschner et al. |
| 2015/0165728 | A1 | 6/2015 | Legrand et al. |

FOREIGN PATENT DOCUMENTS

| | | |
|---|---|---|
| DE | 102014209644 A1 | 11/2015 |
| EP | 1732775 A1 | 12/2006 |

OTHER PUBLICATIONS

European Office Action, dated Jul. 14, 2020, for corresponding European Patent Application No. 18162273.9, filed Mar. 16, 2018.

* cited by examiner

ROOF SYSTEM FOR A VEHICLE

BACKGROUND

The invention relates to a roof system for a vehicle having an opening in a roof part, comprising at least one panel which is at least partly transparent.

In some vehicles there is not enough room for an openable sunroof. The package for mechanisms is not available. Examples are many electrical vehicle (EV) designs which often have coupe lines to lower the Cw Value in order to reduce energy consumption and therefore maximize the range of the vehicle. Light weight and minimum package are key to reaching this goal. In such a roof concept, a possible solution is to integrate a fixed panel function with smart glazing (like switchable glazing, IRR coating, solar cells etc.) and to avoid rollo blinds and glass-mechanisms. If such a fixed panel is used, then the ventilation function of a sunroof is lost, so solutions need to be found to integrate the ventilation function again.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention comprises a roof system for a vehicle having a roof opening in a roof part thereof above a vehicle interior, comprising:

at least one panel in the roof opening, which panel is at least partly transparent, a ventilation system for moving air into and/or out of the vehicle interior, the ventilation system including an air guiding channel guiding air between the vehicle interior and the environment through at least one ventilation opening, wherein the air guiding channel is fitted centrally below the transparent panel and extends in longitudinal direction of the vehicle, preferably substantially completely along the panel and communicates with the interior at least along a substantial length of the panel.

Due to this air guiding channel fitted centrally below the transparent panel, the passengers of the vehicle which normally sit off-center in the vehicle interior experience no loss of head room, while it is possible to allow the air guiding channel to communicate with the vehicle interior along a greater length thereof, especially if the air guiding channel extends substantially along the complete length of the panel and communicates with the interior along a substantial part of this length.

The air guiding channel may comprise a plurality of holes towards the vehicle interior, wherein the holes of the air guiding channel are distributed, for example, along the length thereof, wherein preferably the size and distribution density of the holes increase in a direction away from the at least one ventilation opening, the holes being preferably elongated in longitudinal direction of the air guiding center, the length of the holes may vary in length along the length of the air guiding channel to vary the size.

Due to these holes, the air is distributed or exhausted along a substantial length of the vehicle interior, and the holes may be designed such that air flow is evenly distributed through the interior.

In one embodiment, the at least one panel defines an upper boundary of the air guiding channel.

Allowing the panel to form part of the channel minimizes the weight of the system and the building package.

In another embodiment, the air guiding channel is formed independently of the panel.

This provides a greater design freedom. It is possible for example to make a panel to be openable or removable without affecting the air guiding channel.

The ventilation system may include a blower in the air guiding channel near the ventilation opening, but as an alternative or in addition, the ventilation system may be connectable to a blower of the vehicle.

The ventilation opening is preferably in or below the plane of the roof surface, i.e. does not disturb the streamline and appearance of the vehicle roof. The ventilation opening may be behind the at least one panel, and is either a central ventilation opening, or a ventilation opening extending substantially the complete width of the at least one panel.

However, it is now preferred that the ventilation opening is at or near a front of the at least one panel, and is preferably a central ventilation opening.

If the ventilation opening is at the front, the blower will generally be at the front as well, and this is favorable because there is normally sufficient room available centrally at the front of the panel.

The air guiding channel may comprise a valve in or near the at least one ventilation opening, the valve being preferably a movable flap in the ventilation opening which is actuator, e.g. motor, driven and electronically controlled, for example through a temperature sensor in the vehicle, or through a control button.

The valve may be necessary to be closed in such cases when the vehicle is driven and the interior airflow of the vehicle's air conditioning or climate unit is directed through air extractors of the vehicle. The valve may also be closed in situations whereby due to low outside temperatures no cold drafts are admitted into the interior. The valve may be open in such cases that in driving or in vehicle stationary conditions the ventilation system is switched on either manually or automatically. The valve is operated to an open position in a direction of the outlet air of the blower.

The ventilation opening may be formed substantially completely in and below the panel, and the flap then closes the opening in the panel in its closed position, the upper surface of the closed flap being coplanar with the upper surface of the panel, so that the flap hardly influences the appearance of the roof, especially if the material of the flap is or looks the same as that of the panel.

In this manner, the ventilation opening can easily be integrated in the roof system, so that no changes in the vehicle itself are required to accommodate the ventilation opening.

The moving flap is preferably provided with a mechanism to move the flap in a controlled manner and which is connected with the flap on the one hand and with the actuator on the other hand, the actuator, the mechanism and a blower may be combined in a module.

This module may also include an air duct connecting the blower with the ventilation opening and with the air guiding channel.

In a particular embodiment, the ventilation system comprises two blowers each communicating with its own air guiding channel and one blower introducing air into the interior of the vehicle and the other extracting air therefrom. In this manner a forced circulation can be effected in the vehicle's interior.

In a particular embodiment, the air guiding channel has an exterior which is provided with an ambient lighting system, preferably including one or more light sources, such as LED lighted light guiding strips, directly illuminating the interior of the vehicle, and/or one or more light sources, indirectly illuminating the interior.

The panel may comprise solar cells providing electricity to the ventilation system, but in addition or as an alternative, the ventilation system can use electricity from the vehicle's battery.

The panel of the roof system may comprise at least three of the following layers:
one or two glass layers;
one or more clear or colored PVB layers;
a semi-transparent PV layer comprising solar cells;
a variable light transmission foil layer.

The panel may also comprise an infrared reflecting (IRR) coating and/or a low emissivity (low-e) coating.

BRIEF DESCRIPTION OF THE DRAWINGS

Hereinafter aspects of the invention will be elucidated while referring to the drawings, in which:

FIG. 7 is a cross-sectional view along the line VII-VII in FIG. 1 on a larger scale, and according to line VII in FIG. 9a.

DETAILED DESCRIPTION OF ILLUSTRATIVE EMBODIMENTS

Figure 1:
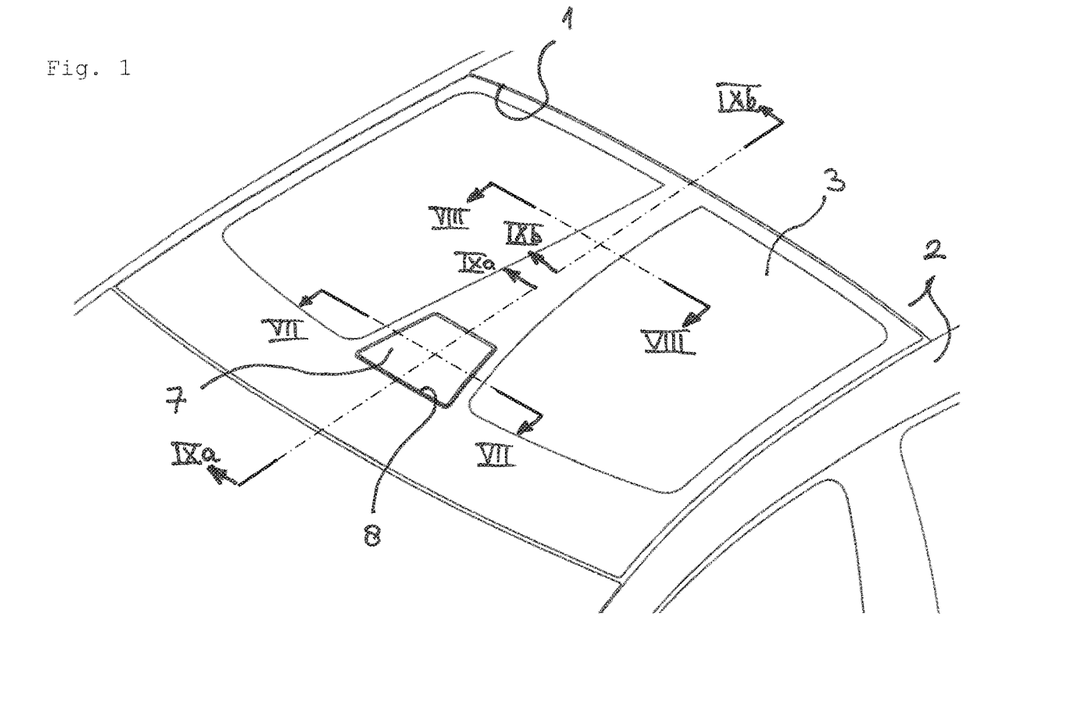
FIG. 1 is a perspective view of a vehicle roof having a roof system.
Figure 2:
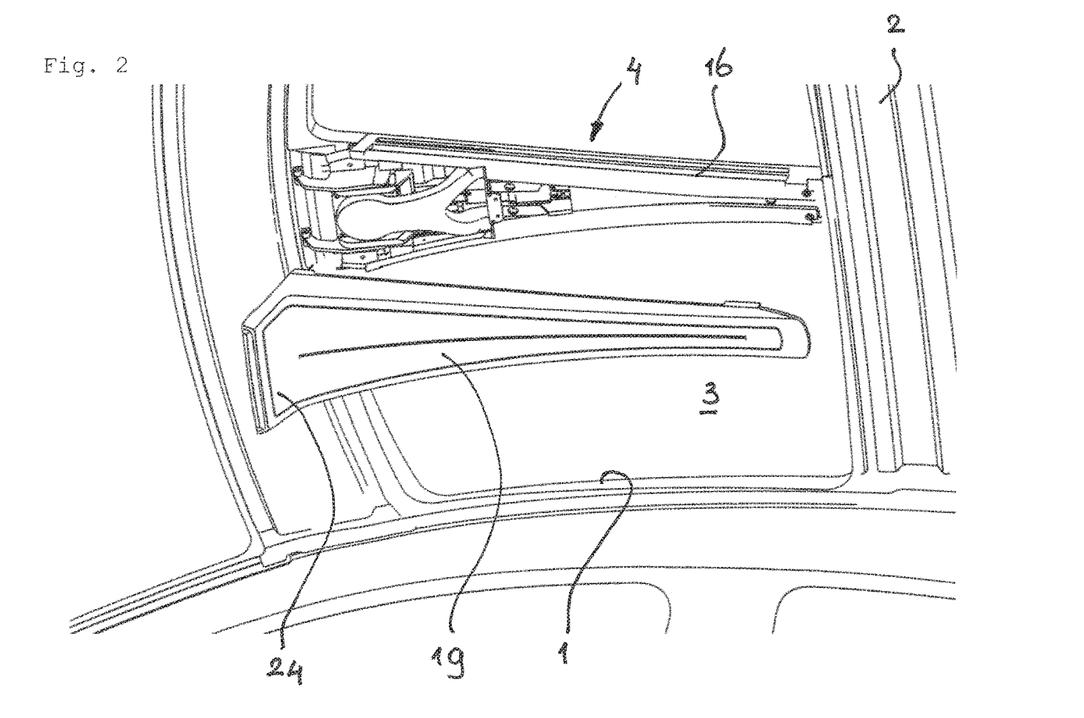
FIG. 2 is an enlarged perspective view from the interior of the vehicle showing the ventilation system of the roof system of FIG. 1 with a cover shown in a removed position.
Figure 11:
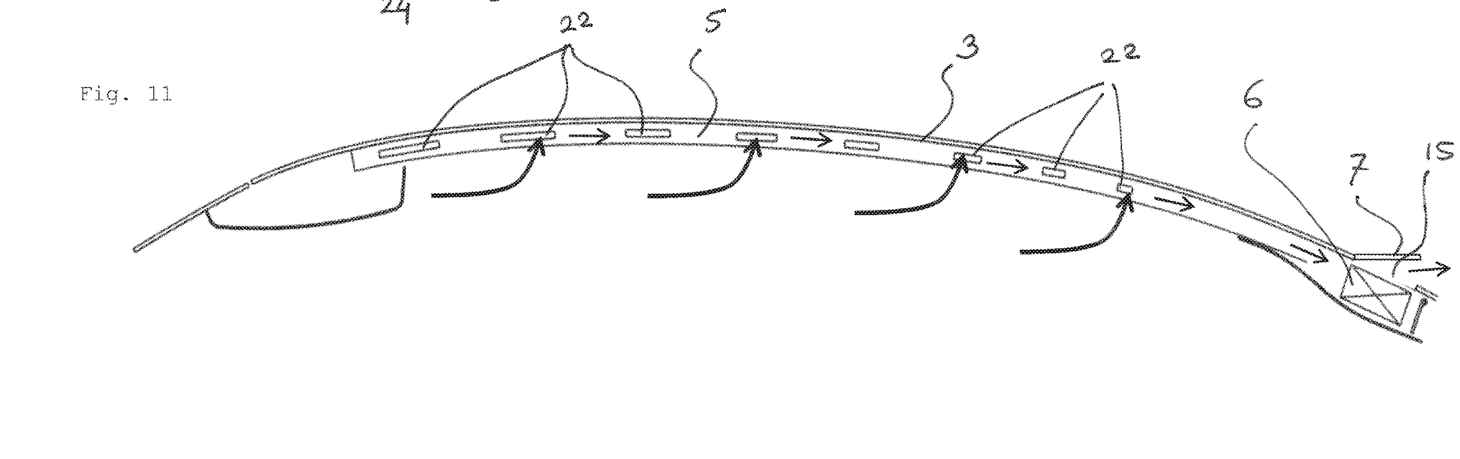
FIG. 11 is a very simplified side view of another embodiment of the roof system.

FIGS. 1, 2 and 11 show two types of vehicles comprising the roof system. The vehicle of FIG. 1, 2 is a hatchback or sedan-type passenger car comprising a relatively flat roof having an opening 1 in its roof 2 to accommodate a panel 3 of the roof system. The vehicle of FIG. 11 is a more streamlines coupé type car including a larger type of panel 3 of the roof system. The vehicles may be cars driven conventionally by internal combustion engines, but the invention is also particularly useful in electric vehicles (EV's) where streamline and weight are of even greater importance to reduce energy use and maximize range with a given battery capacity. This streamline reduces the headroom for car passengers and therefore the roof system should take away barely any headroom so as to not affect the comfort of these passengers.

FIG. 2-5 show the main parts of the roof system that provides improved ventilation without the need to make panel 3 openable. The roof system comprises a ventilation system 4 comprising an air guiding duct or channel 5, a fan or blower 6 and a valve, here in the form of a pivotable rigid flap 7. The air guiding channel 5 is shaped such that it fits to the lower side of panel 3. At least partly transparent (glass and/or plastic) panel 3 may have a black-out layer in a central longitudinal part where air guiding channel 5 is attached (not shown), so that it cannot be seen from the outside of the vehicle. Air guiding channel 5 extends substantially the complete length of panel 3 or at least of opening 1. The upper side of air guiding channel 5 may be open, so that panel 3 forms an upper wall of air guiding channel 5, or air guiding channel 5 may have its own upper wall, so that it can function independently of panel 3.

As is clearly shown in the drawings, the flap 7 forming the valve of the ventilation system 4 is here incorporated in fixed panel 3 and is positioned in the front portion of the panel 3, here just behind the front side of roof opening 1, or possible also overlapping the front side of the roof opening. An opening 8 in the panel 3 is formed and positioned such that it is at least substantially, but here completely surrounded by panel 3. It takes up flap 7 in its closed position so that flap 7 is flush or co-planar with panel 3 when in its closed position. An operating system 9 is provided in order to move flap 7 between its closed and open positions, here by a pivoting movement to lift or lower the rear side of flap 7.

Figure 3:
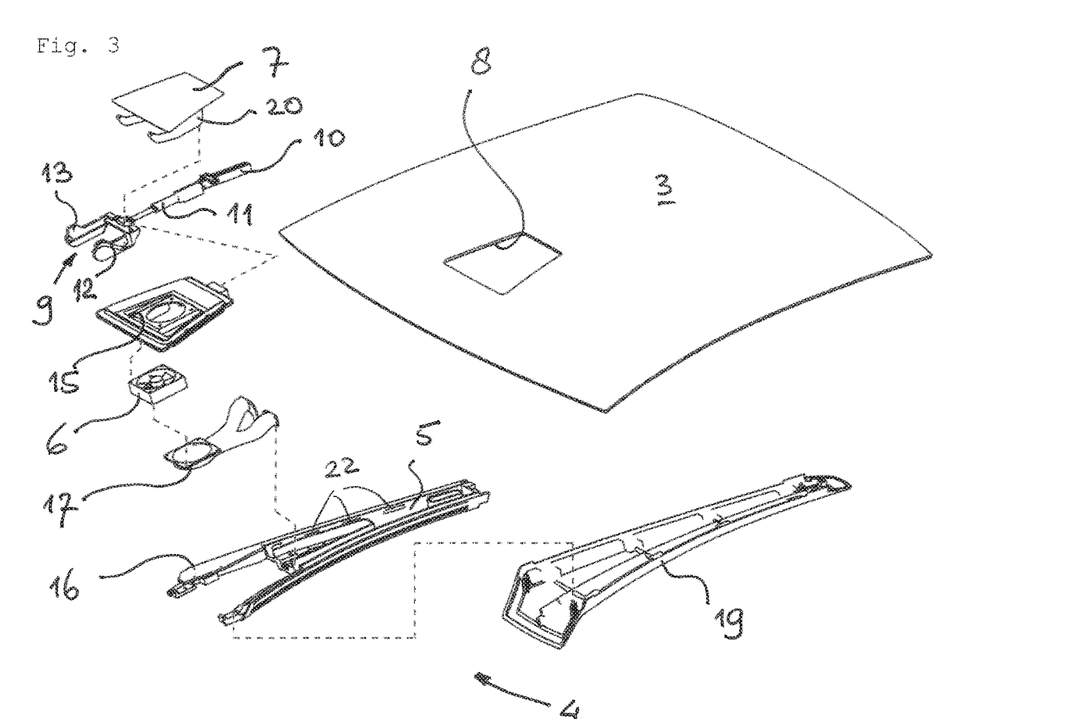
FIG. 3 is an exploded perspective view of the panel and ventilation system of FIG. 2, as seen from the front.
Figure 4:
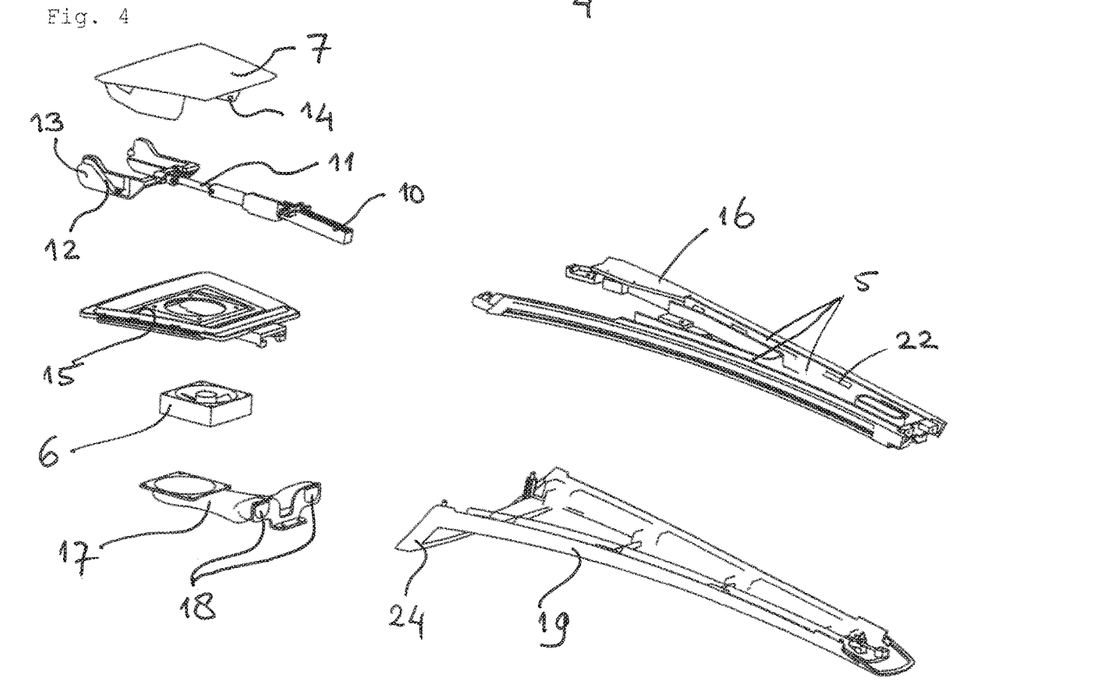
FIG. 4 is an enlarged exploded perspective view of the ventilation system, as seen from the rear.
Figure 5:
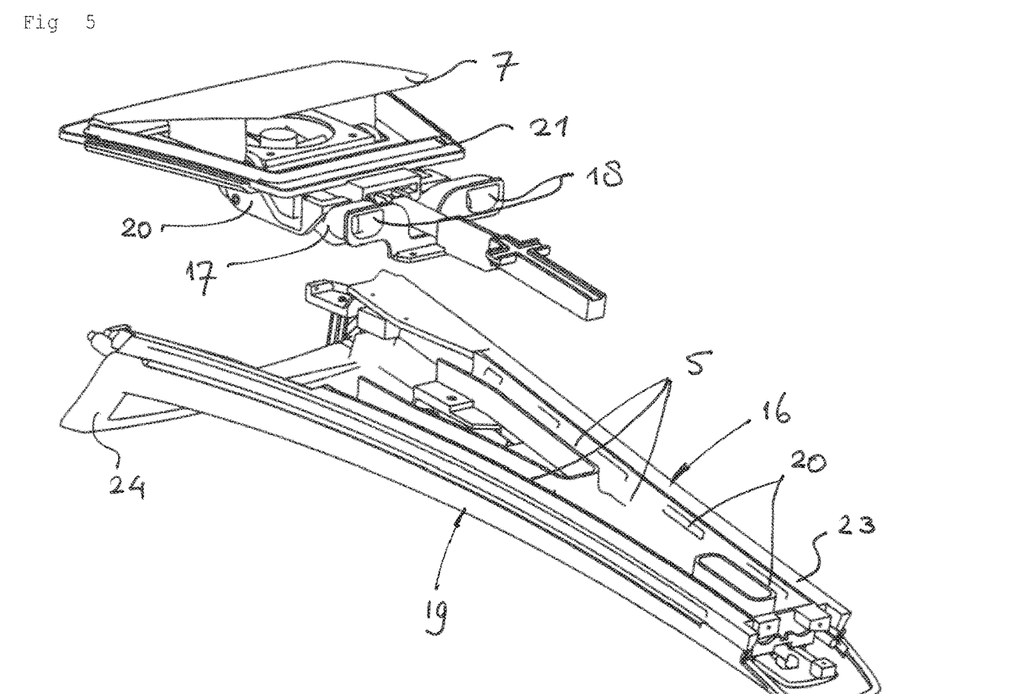
FIG. 5 is enlarged perspective view, partly exploded, of the ventilation system of FIG. 4.

The operating mechanism 9 includes a mounting element 10, an hydraulic actuator 11 (may also be an electric motor) attached to the mounting element on one end, and on the other end to a pin-slot mechanism including curved slots 12 in a slide 13 and pins 14 below flap 7. FIGS. 3-5 show the parts of this operating mechanism 9.

FIGS. 3-5 also show blower 6 that is provided at the front end of air guiding channel 5 below pivotable flap 7. Blower 6 in the form of a fan here is adapted to either exhaust and/or draw-in air to and/or from the environment. In FIGS. 3-5, blower 6 is used to exhaust air from the interior of the vehicle. Blower 6 can be of any type, will normally be electrically driven, the electricity will be delivered by either the battery of the vehicle and/or by solar cells on the roof 2 of the vehicle, in particular in panel 3. The electricity may be delivered either directly to blower 6 or through a battery. In an EV, the electricity of the solar cells may be delivered to the main battery of the vehicle used for driving the electric motor(s).

If the ventilation system 4 is used to ventilate the vehicle when it is parked, it will be provided with a control system including a temperature sensor which will generate a signal when a temperature limit is exceeded. The control system will then energize motor 10 of flap 7 to open a ventilation opening 15 above blower 6, while a motor of blower 6 will also be energized to exhaust hot air from the interior of the vehicle to the environment in order to lower the temperature in the interior, so that the climate in the interior is pleasant when passengers enter the vehicle.

Figure 6:
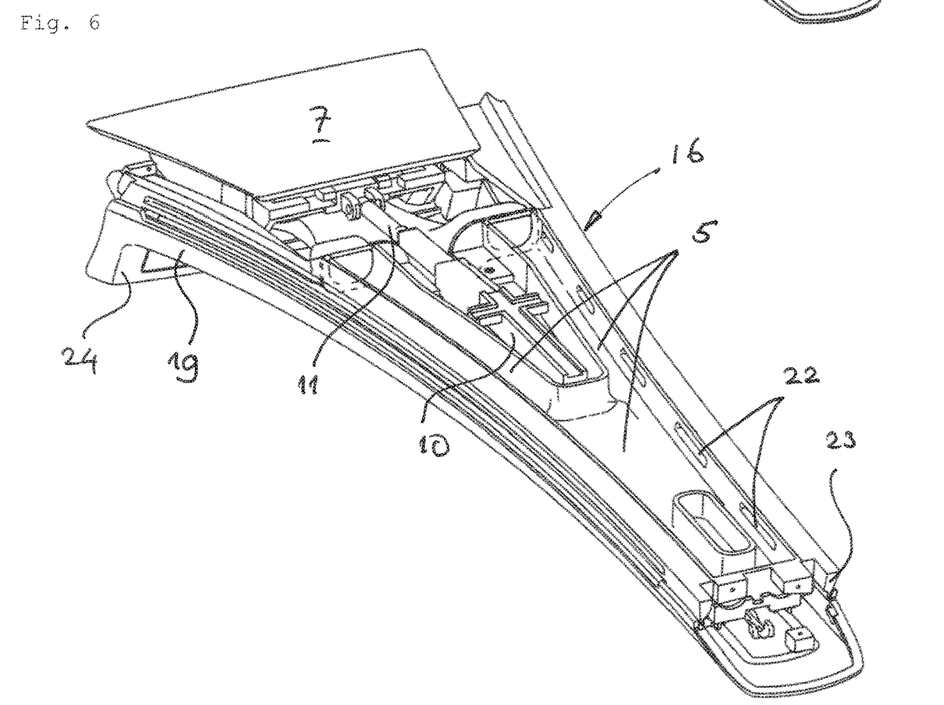
FIG. 6 is perspective view similar to that of FIG. 5, but in fully assembled condition and with the valve closed.

FIGS. 2-5 clearly show that ventilation system 4 includes a basic part 16 including the air guiding channel 5, a duct member 17 holding blower 6 (having an upright axis of rotation) and including one or more ducts 18 connecting blower 6 with air guiding channel 5. As is shown here duct member 17 include two ducts 18 connecting to channel 5 at a position where it is split in two portions which are united at a position to the rear of channel 5. A cover 19 covers the ventilation system 4 at the bottom and may include accessories, such as ambient lighting etc. FIG. 5 shows that duct member 17 is the basis of a module including blower 6, flap 7 with the frame comprising ventilation opening 15 and the operating mechanism 9 for flap 7. The module can be pre-assembled and then be mounted in basic part 16, as is shown in FIG. 6.

Figure 7:
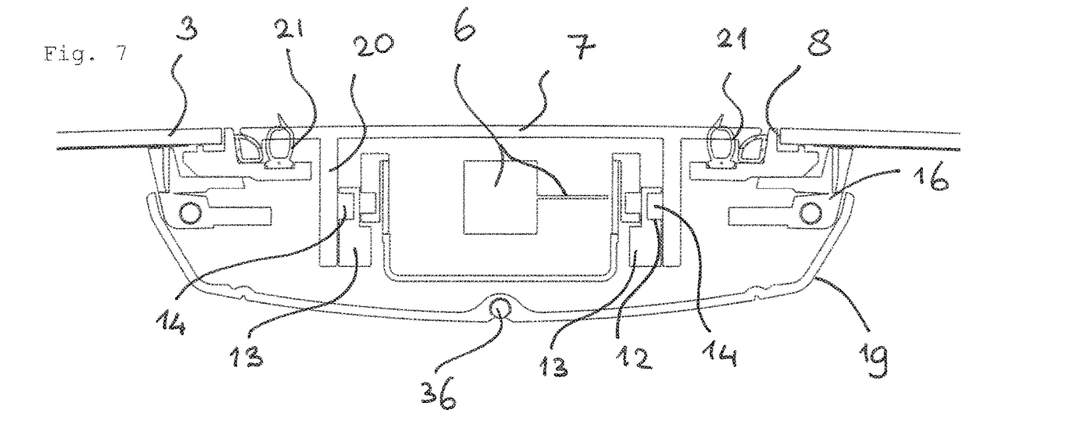

FIG. 7 shows details of the ventilation system 4 below flap 7. One can recognize flap 7 with downward walls 20 including the pins 14 engaging in slots 12 of slide 13. Blower 6 is attached to duct member 17. Ventilation opening 15 is formed in a ring-like frame attached to basic member 16 and provided with a seal 21A to allow flap 7 to close ventilation opening 15 in a liquid-tight manner. A drainage system can be provided outwardly of seal 21A and inwardly of seal 21B to drain off any water between seals 21A and 21B.

The air guiding channel 5 extends almost along the complete longitudinal length of panel 3, e.g. along more than 75% thereof, and is provided with holes 22 distributed along the length of channel 5 on opposite sides thereof. The size and distribution density of holes 22 may vary along the length of channel 5, in particular may increase in a direction away from blower 6 in order to draw-in air evenly from the whole length of the area just below panel 3. To increase the size of holes 22, their length, i.e. their elongation can be varied, as is shown here. The holes 22 are distributed along at least a substantial length of panel 3 in longitudinal direction, e.g. more than a quarter of the length or even more than half of the length.

Figure 8:
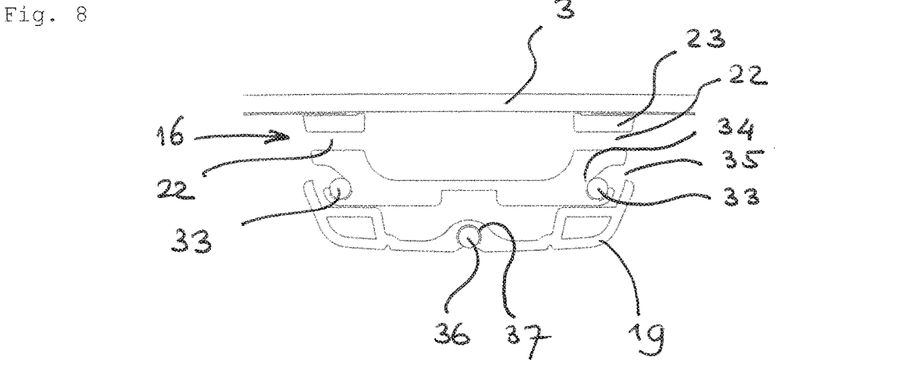
FIG. 8 is a cross-sectional view along the line VIII-VIII in FIG. 1 on a larger scale, and according to line VIII-VIII in FIG. 9b.

FIGS. 7 and 8 show on two different positions a cross-section of panel 3 and ventilation system 4 comprising basic part 16 including air guiding channel 5 and holes 22, as well as cover 19. In this embodiment, the upper wall of air guiding channel 5 is formed by the lower side of panel 3. An adhering layer, such as glue or tape, is used to attach the upper end of side walls 23 of basic part 16 to the lower side of panel 3. Another possibility is to adhere mounting brackets to panel 3 and to attach the ventilation system 4 to the mounting brackets, for example by screws or bolts in order to be able to easily demount the ventilation system, for example for service or replacement purposes.

As is shown in the drawings, the height of air guiding channel 5 is relatively small (for example 15-25 mm, and for the complete module 30-60 mm) and is only present in the longitudinal centre of the vehicle so that it will not affect the headroom of passengers in the vehicle most of which sit outside the centre of the vehicle. As a result, the vehicle may obtain a low, streamlined profile and still offer sufficient headroom. The position of blower 6 will normally be in front of the front passengers. The width of the ventilation system 4 increases towards the front where blower 6 is arranged, and this is also favourable as at the front there is more room available than at the rear.

Figure 9A:
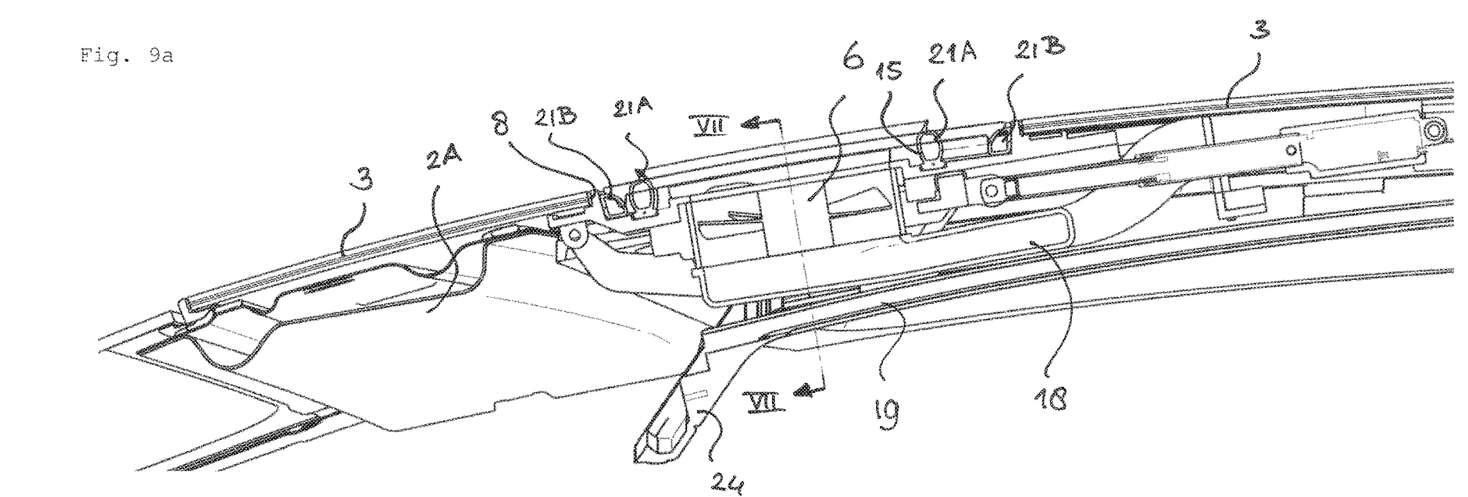
FIG. 9a, 9b are cross sectional views along the line IXa-IXa, IXb-IXb respectively in FIG. 1 on a larger scale.

FIG. 9a shows the front of panel 3 with suspended ventilation system 4 in longitudinal section including blower 6, duct member 16 with duct 17, mounting element 10, actuator 11 etc. One can also recognize that roof system can be easily mounted from above (Top Loader) without special measures to the vehicle other than removing or leaving out a part of the roof skin 2A and roof reinforcement 2A of fixed roof 2. Panel 3 will normally be attached to reinforcement 2A by gluing or the like.

Figure 9B:
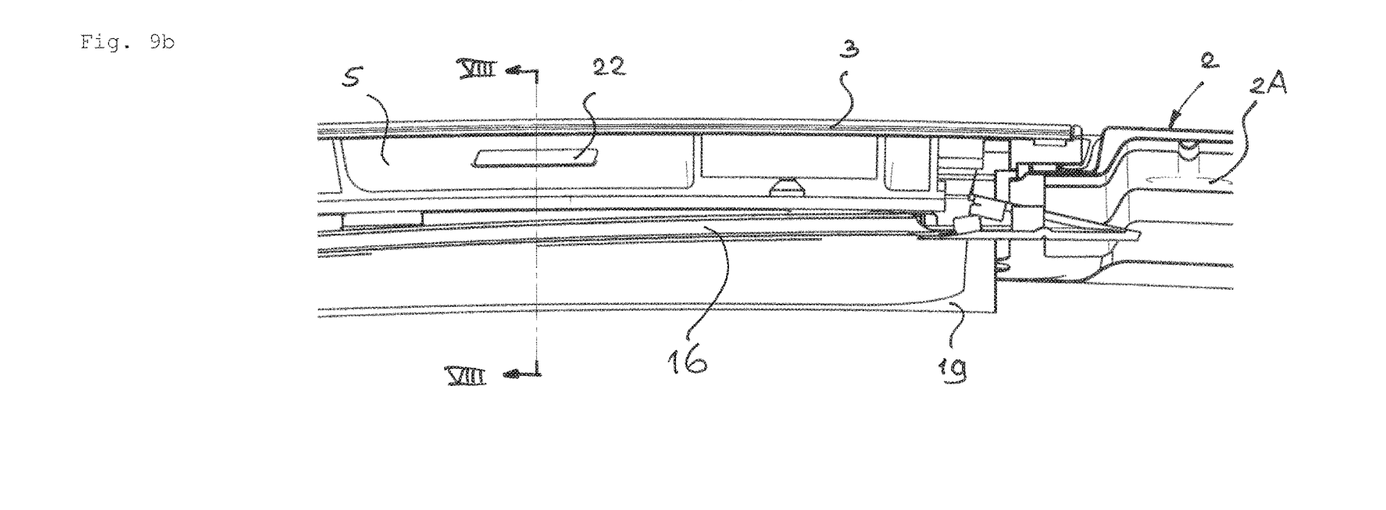

FIG. 9b shows the rear of panel 3 and ventilation system 4.

Figure 10:
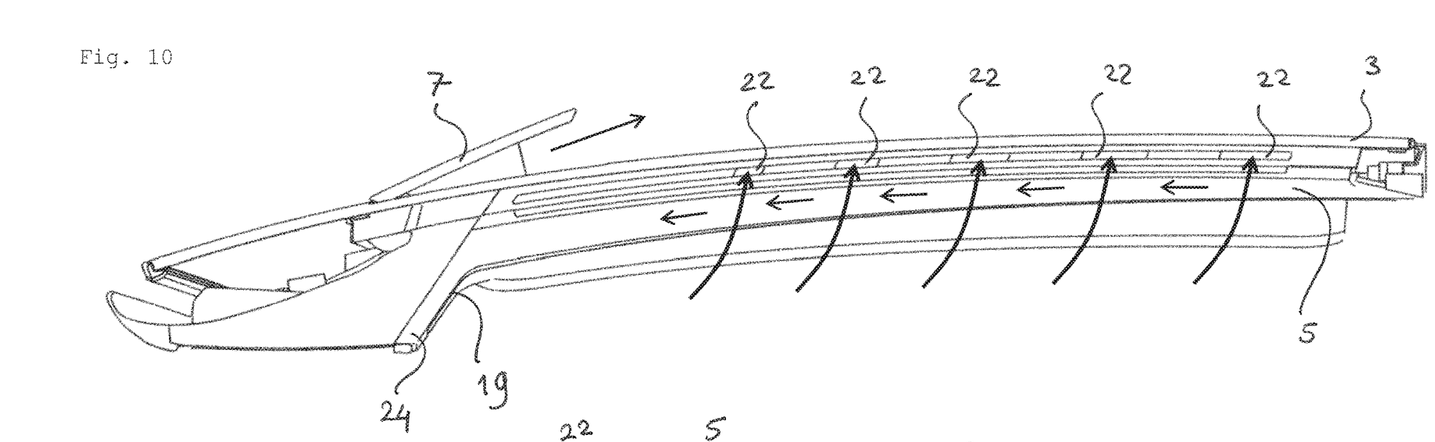
FIG. 10 is a side view of the ventilation system and panel of FIG. 3 on a larger scale.

FIG. 10 is a side view of ventilation system 4 illustrating by means of arrows an air flow from the vehicle interior to air guiding channel 5 through holes 22. It is clearly visible that holes 22 at the rear are larger than holes 22 at the front. It is also clear that the front end of cover 19 has a downward portion 24 with which cover may connect to a front roof console of the vehicle where operating controls for the vehicle and/or the ventilation system may be provided. The shape of cover 19 will of course be adapted to the vehicle in which ventilation system is incorporated.

FIG. 11 shows another embodiment of ventilation system 4. It was already explained above that in the FIG. 11 embodiment, the glass panel 3 almost takes up the whole roof and rear window of the vehicle. In this case, ventilation opening 15 is at the back of the vehicle, just above the trunk. Of course, it would also be possible to use a rear ventilation opening in combination with a smaller panel 3. Blower 6 is positioned below/in front of ventilation opening 15.

Figure 12:
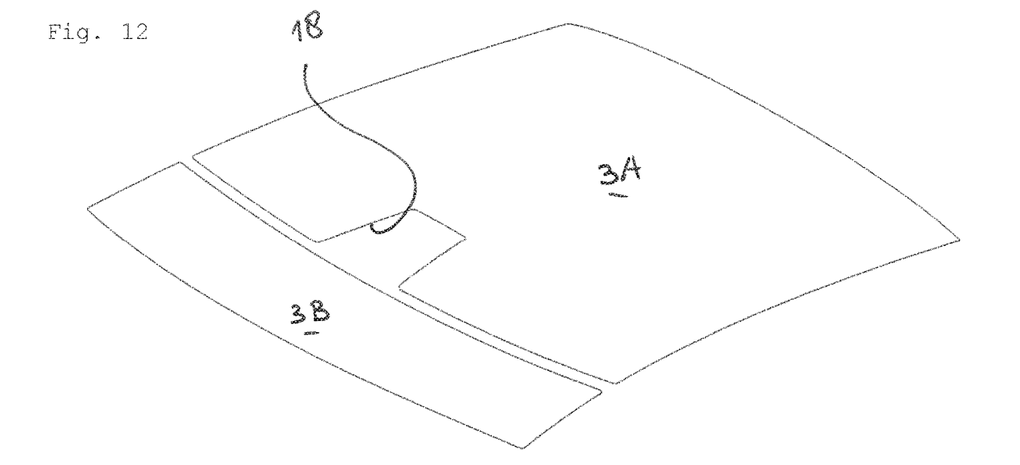
FIG. 12 is a perspective view of an alternative embodiment of the panel of the roof system.

FIG. 12 shows a two part panel 3 having a main rear part 3A and a front part 3B, such that opening 8 is made adjacent front side of panel rear part 3A and rear side of front part 3B defines front of opening 8. Both this hole 8 or hole 8 remote from front of panel 3 can be made e.g. by water jet cutting, or in any other manner available. Such cutting is easier in an edge of panel 3 than at a distance from all edges, and for this reason, the panel 3 has been cut into two parts 3A, 3B here. So, also in this embodiment, the opening 8 in panel 3 is completely surrounded by panel 3, but by two different parts 3A, 3B thereof.

Figure 13:
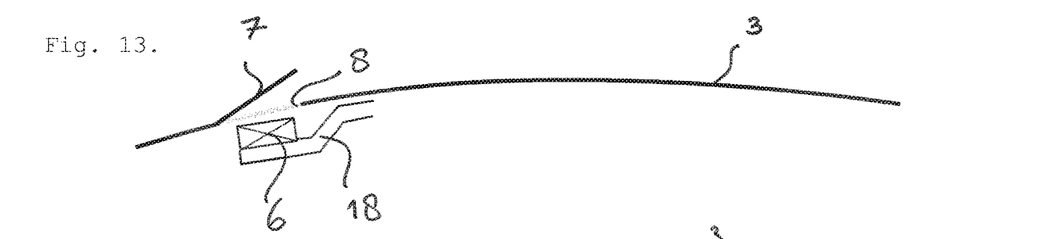
FIGS. 13-16 illustrate in a side view the panel with four differently opening valve flaps with corresponding blower and air duct positions.

FIGS. 13-16 show variations in the way ventilation flap 7 moves between open and closed positions, and variations in the position of blower 6. FIG. 13 shows the embodiment of FIGS. 1-10 with an upwardly pivoting flap 7, a blower having a vertical air flow and a duct 18 connecting to the lower side of blower 6.

Figure 14:
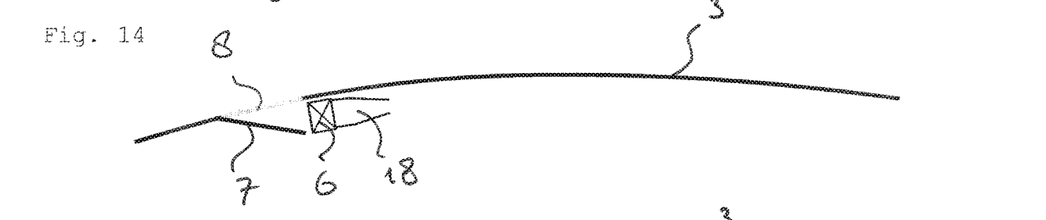

FIG. 14 shows an embodiment having a downwardly pivoting flap 7 (with a pivoting axis at the front), such that blower 6 can have a horizontal air flow and duct 18 connects to the rear side of blower 6 making duct relatively short and simple.

Figure 15:
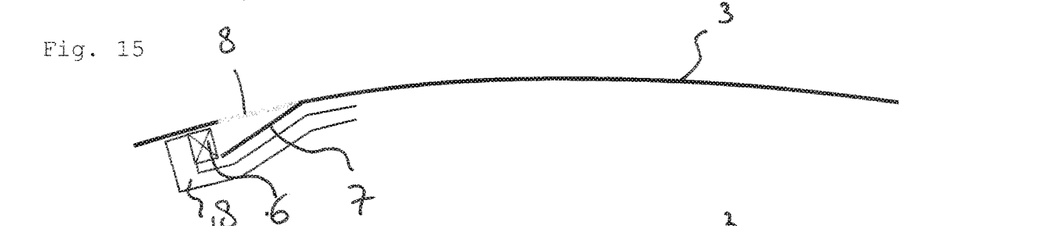

The embodiment of FIG. 15 also has a downwardly pivoting flap 7, but now with pivoting axis at the rear side so that duct 18 connects to the front side of blower 6 and extends below blower and downwardly pivoted flap 7 to the rear.

Figure 16:
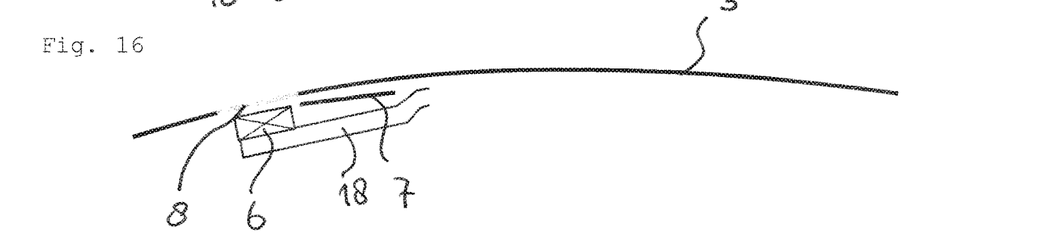

FIG. 16 shows a last variation with flap 7 being a downward slider in which flap 7 is moved from its closed position downwardly and rearwardly below panel 3. The position of blower 6 can be the same as in FIG. 13, but duct 18 should leave room for flap 7 in open position.

Figure 17:
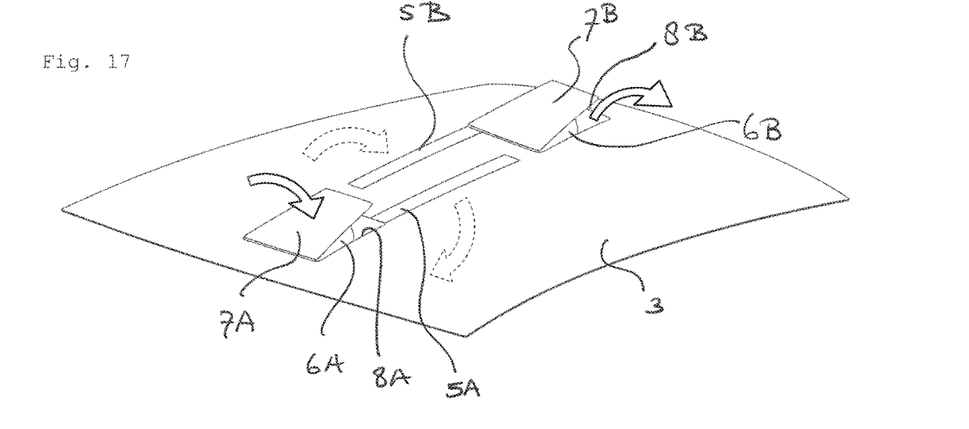
FIG. 17 is a simplified perspective view of a panel having two valve flaps, blowers and air guiding channels.

FIG. 17 illustrates an embodiment in which ventilation system 4 includes a front blower 6A and a rear blower 6B. Each connects to its own air guiding channel 5A and 5B, such that rear blower 6B exhausts hot air from the vehicle interior by means of opening 8B opened by flap 7B, while front blower 6A blows cool air into the interior through opening 8A opened by flap 7A, so that a circulation of air is accomplished (see dashed arrows).

Figure 18:
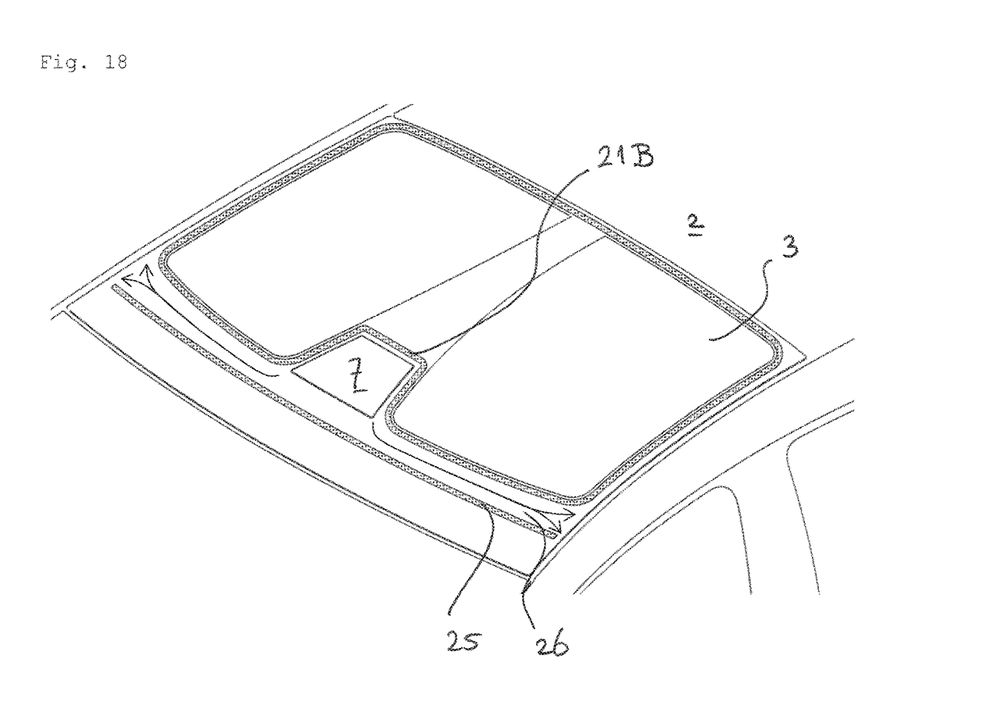
FIG. 18 is a perspective view of a vehicle roof having a roof system to illustrate the water drain structure thereof.

FIG. 18 illustrates the use of a drainage system to drain off water caught by a water channel between seal 21B and a seal 25 to a front channel 26 draining water to the sides of the vehicle where it can be drained either through the A-pillars of the vehicle (internal water management) or directly to the outside of roof 2 (external water management).

Figure 19:
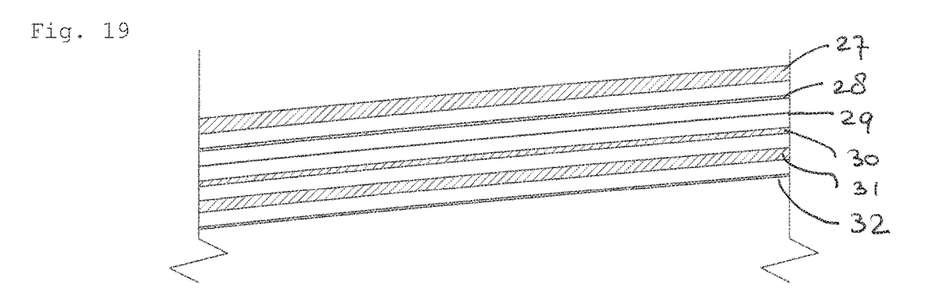
FIG. 19 shows in a cross section the separate layers of a panel for use in the roof system.

FIG. 19 illustrates in a very schematic way layers forming panel 3. The following layers are used in this particular, nonlimiting embodiment (from top to bottom):
- 27: 2.10 mm extra clear semi-tempered glass with black-out coating;
- 28: 0.38 mm light-blue polyvinyl butyral (PVB)
- : 0.40 semi-transparent a-Si photo voltaic (PV) cells (not shown here)
- 29: 0.05 optional infrared reflecting (IRR) PET coating
- 30: 0.76 mm acoustic PVB (ca. 18% transparency)
- 31: 1.60 mm clear semi-tempered glass
- 32: switchable film This panel 3 has excellent properties. If it is optionally provided with PV cells, it may provide sufficient electricity to drive blower 6. The switchable film may for example be liquid crystal in which a dichroic dye is dissolved between two flexible substrates with transparent conductive oxide (TCO) layers. By applying voltage to the electrodes, it controls the transmittance and color tone of the device by utilizing the electro-optical characteristics of the liquid crystal. This film can switch between transparent and almost completely dark.

Figure 20:
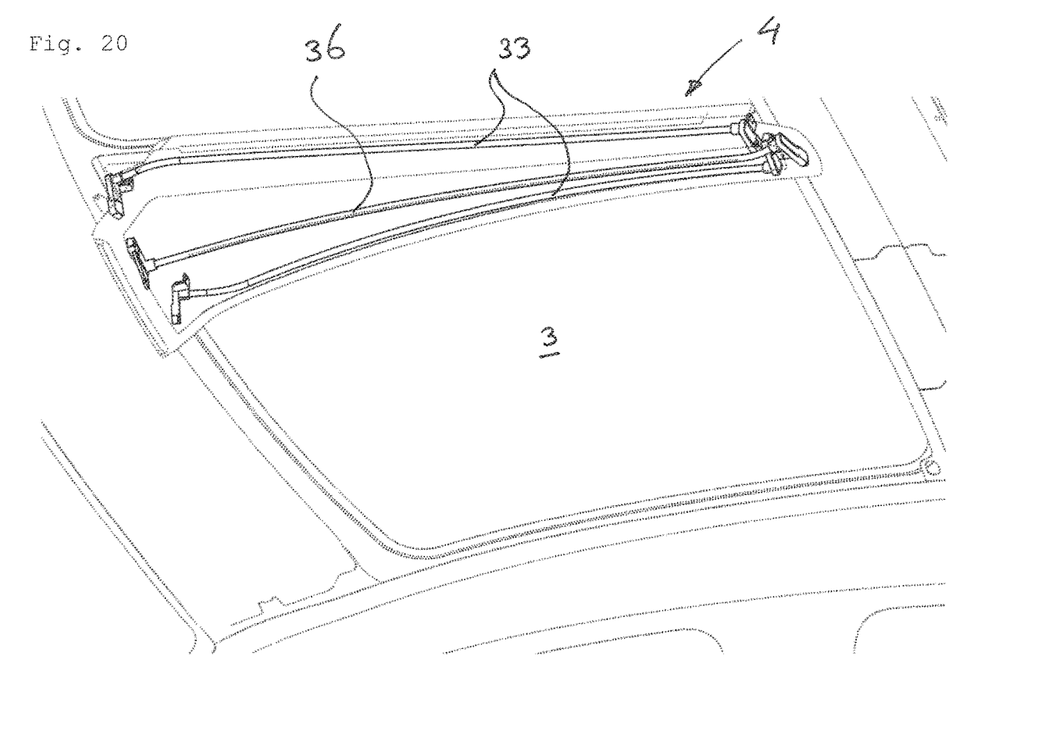
FIG. 20 is a perspective view of the roof system, similar to that of FIG. 2, to illustrate the ambient lighting system used in the ventilation system.

FIG. 20 shows the possibility to incorporate ambient lighting in the basic part 16 and cover 19 of ventilation system 4. This lighting may include two light strips 33 mounted in a corresponding groove 34 (see FIGS. 6 and 7) in basic part 16 to illuminate the interior of the vehicle indirectly due to the fact that openings 35 to conduct the light are positioned upwardly of the light strips 33. It may also include one light strip 36 mounted in a bottom groove 37 (see FIGS. 6 and 7) in cover 19 to directly illuminate the interior of the vehicle. The strips 33, 36 may be LED lighted, but any other form of lighting is conceivable of course.

The features of the roof system herein described can provide improved ventilation of the vehicle interior, while avoiding loss of headroom for the passengers. The roof system includes all parts including the ventilation opening, so that the roof system can easily be integrated in the vehicle and does not disturb the appearance of the vehicle, at least not in closed position. Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A roof system for a vehicle having a roof opening in a roof part thereof above a vehicle interior, comprising:
   panel in the roof opening, which panel is at least partly transparent;
   a ventilation system configured to move air into and/or out of the vehicle interior, the ventilation system including an air guiding channel configured to guide air between the vehicle interior and the environment through at least one ventilation opening and a flap or valve substantially flush with the panel; and
   wherein the air guiding channel is fitted centrally below the panel and extends in a longitudinal direction of the vehicle and communicates with the interior at least along a substantial length of the panel.

2. The roof system of claim 1, wherein the air guiding channel comprises a plurality of holes towards the vehicle interior.

3. The roof system of claim 2, wherein the holes of the air guiding channel are distributed along a length thereof.

4. The roof system of claim 3, wherein the holes of the air guiding channel are distributed along a length thereof wherein sizes and distribution density of the holes increase in a direction away from the at least one ventilation opening.

5. The roof system of claim 4, wherein the holes are elongated in longitudinal direction of the air guiding channel.

6. The roof system of claim 5, wherein a length of the holes varies in length along the length of the air guiding channel to vary the size of the holes.

7. The roof system of claim 1, wherein the panel defines an upper wall of the air guiding channel.

8. The roof system of claim 7, wherein a width of the air guiding channel increases in the direction of the ventilation opening.

9. The roof system of claim 1, wherein the ventilation system includes at least one blower in the air guiding channel near the at least one ventilation opening.

10. The roof system of claim 1, wherein the ventilation opening is at or near a front of the panel.

11. The roof system of claim 1, comprising two blowers each communicating with its own air guiding channel, one blower introducing air into the interior of the vehicle and the other extracting air therefrom.

12. The roof system of claim 1, wherein the ventilation opening is formed substantially completely in the panel.

13. The roof system of claim 1, wherein the flap is provided with a mechanism to move the flap in a controlled manner and which is connected with the flap on the one hand and with an actuator on the other hand.

14. The roof system of claim 13, wherein the actuator, the mechanism and a blower comprise a module, and the module also includes an air duct connecting the blower with the ventilation opening and with the air guiding channel.

15. The roof system of claim 1, wherein the air guiding channel has an exterior which is provided with an ambient lighting system.

16. The roof system of claim 1, wherein the panel comprises solar cells providing electricity to the ventilation system.

17. A roof system for a vehicle having a roof opening in a roof part thereof above a vehicle interior, comprising:
   at least one panel in the roof opening, which panel is at least partly transparent;
   a ventilation system configured to move air into and/or out of the vehicle interior, the ventilation system including an air guiding channel guiding air between the vehicle interior and the environment through at least one ventilation opening; and
   wherein the air guiding channel is fitted centrally below the panel and extends in a longitudinal direction of the vehicle, when mounted therein, the air guiding channel extending substantially completely along the panel and communicating with the interior at least along a substantial length of the panel.

18. The roof system of claim 17 wherein the substantial length of the panel comprises more than half of the length of the panel in the longitudinal direction.

19. The roof system of claim 17, wherein the air guiding channel comprises a plurality of holes opening towards the vehicle interior.

20. The roof system of claim 19, wherein the holes of the air guiding channel are distributed along the length thereof, and wherein the sizes and distribution density of the holes increase in a direction away from the at least one ventilation opening, the holes being elongated in longitudinal direction of the air guiding channel.

21. The roof system of claim 17, wherein the at least one ventilation opening is at or near a front of the at least one panel.

* * * * *